United States Patent Office 3,253,975
Patented May 31, 1966

3,253,975
GLASS BODY HAVING A SEMICRYSTALLINE SURFACE LAYER AND METHOD OF MAKING IT
Joseph S. Olcott, Painted Post, and Stanley D. Stookey, Corning, N.Y., assignors to Corning Glass Works, Corning, N.Y., a corporation of New York
No Drawing. Filed June 11, 1963, Ser. No. 286,934
The portion of the term of the patent subsequent to Sept. 5, 1978, has been disclaimed
4 Claims. (Cl. 161—1)

This application is a continuation-in-part of our pending application Serial No. 824,179, July 1, 1959.

This invention relates to the manufacture of semi-crystalline ceramic bodies by the controlled crystallization by heat treatment of glass bodies. Prior semicrystalline bodies were made by melting and shaping a glass which was thereafter treated by heat at controlled temperatures to convert it throughout to the state of finely divided crystals substantially uniformly dispersed in a glassy matrix.

The primary object of this invention is a method of making a glass body having on its surface a thin, compressive semicrystalline layer of the same oxide composition as the glass.

Another object is to provide a particular range of glass compositions especially suited for use with such method.

Another object is to provide a glass body of high mechanical and thermal strength having a semicrystalline surface by such method.

For some purposes, such as an increase in the mechanical and thermal strength of a glass body, it is desirable to provide it with a compressive stress in and parallel with its surface. One method of accomplishing this is the process known as tempering, which does not alter the oxide composition of the glass and which comprises heating the glass body while avoiding devitrification thereof and then rapidly cooling it. The maximum mechanical strength or modulus of rupture of an abraded tempered glass article of the type used for culinary purposes does not normally exceed 12,000–16,000 p.s.i. as compared to an abraded annealed glass article, the modulus of which is approximately 6,000–8,000 p.s.i.

A higher compressive stress may be produced in the surface of a glass body by the introduction therein of lithium ions by the ionic migration of lithium into the surface in the exchange for the potassium and sodium ions of the glass. The surface layer of the glass body thereby acquires a different chemical composition and a lower expansion coefficient than the unaffected interior of the body, which results in a compressive stress in its surface layer. If the glass contains suitable proportions of alumina and silica, such method may also result in the formation of beta-spodumene crystals in its surface, which further lowers its expansion co-efficient and increases the surface compressive stress. Such method requires the immersion of the glass body in a bath containing a molten lithium salt heated above the strain point of the glass. Molten salt baths are difficult and dangerous to manipulate.

We have now discovered a new method of producing similar useful effects whereby higher mechanical strengths can be obtained without the use of a molten salt bath while the chemical composition of the glass body remains unchanged throughout.

Broadly the new method comprises heat treating a glass body consisting essentially, by weight, of at least 52 but less than 65 parts of $SiO_2$, not less than 4 parts of $Li_2O$ and not more than 40 parts of $Al_2O_3$, the weight ratio $Li_2O/Al_2O_3$ being not more than about 0.3/1, the total $SiO_2$, $Li_2O$ and $Al_2O_3$ being at least 100 parts by weight and the total composition being not more than 110 parts by weight, by heating it at a temperature at which its viscosity is between $10^7$ and $10^{10}$ poises for a time ranging from about 1 hour to about 40 hours respectively until microscopic and submicroscopic crystals of beta-eucryptite are formed within its surface. The temperature corresponding to a viscosity of $10^7$ poises is somewhat above the softening point, which by definition is the temperature at which the viscosity is about $10^{7.6}$ poises, and heat treatments at these temperatures tend to cause deformation unless the glass article is adequately supported. At viscosities less than $10^7$ poises the deformation tendency is impracticably great. On the other hand, heat treatments at viscosities greater than $10^{10}$ poises require times of such long duration as to be impractical.

In the above defined range of compositions, glasses having $SiO_2$ contents at or near the minimum and $Li_2O$ contents at or near the maximum have viscosities in the neighborhood of $10^7$ poises at about 870° C. and glasses having $SiO_2$ contents at or near the maximum and $Li_2O$ contents at or near the minimum have viscosities in the neighborhood of $10^{10}$ poises at about 750° C. or less. As a result of the new method a thin, compressive, semicrystalline layer containing a multiplicity of microscopic and submicroscopic crystals of beta-eucryptite $$(Li_2O \cdot Al_2O_3 \cdot 2SiO_2)$$

as the primary crystalline phase and having a linear thermal expansion coefficient substantially lower than that of the glass per se is formed in and below its surface.

It is characteristic of the method of this invention that it causes such crystallization to occur only in the surface of the glass while leaving the interior thereof substantially unchanged with its original transparency; and that the resulting article as a whole is substantially transparent on account of both the thinness of such semicrystalline layer (about 0.1 mm.) and the relative similarity of the refractive indices of the crystals and the glass, there being at the most a slight translucency of the surface. The linear expansion coefficient of the semicrystalline layer is substantially lower than that of the glass interior, because the crystalline beta-eucryptite, which is formed, has a cubical expansion coefficient in the neighborhood of zero. Moreover, the expansion coefficient of the residual glassy matrix surrounding such crystals is also relatively lower than that of the unchanged glass of the interior, because the formation of the beta-eucryptite has left the matrix with a lower available content of $Li_2O$ per se, which has a high thermal expansion factor. The lower expansion coefficient of the semicrystalline surface layer relative to that of the interior of the glass establishes a uniform compressive stress in and parallel to the surface after the article is cool whereby the modulus of rupture of the article is substantially increased.

It is further characteristic of the new method of this invention, in contrast to prior methods of making semicrystalline ceramic bodies, that the formation of such semicrystalline surface layer is dependent only upon composition and heat treatment and not upon the presence in the glass of nucleating agents or crystallization catalysts, although the presence of certain of such agents in limited amounts is not harmful and usually facilitates the surface crystallization, as will later appear.

The proportions of the above-recited ranges of $SiO_2$, $Li_2O$ and $Al_2O_3$ are critical for the purpose of this invention and such limits should be maintained for the following reasons: When the $SiO_2$ content is too low the viscosity of the glass is so low that working it by the conventional procedure of pressing or blowing it and the like is impracticable; but when the $SiO_2$ content is higher than about 65 parts by weight, the desired crystallization in the surface of the glass will not occur without a crystallization catalyst being present in the composition. On the other hand, when the $Al_2O_3$ content exceeds about 40 parts by weight the glass is too viscous and difficult to melt at temperatures compatible with present day refractories. The glass crystallizes throughout after heat treatment if the $Li_2O$ content is more than about ⅓ the amount of $Al_2O_3$ but the glass is difficult to melt, and the desired crystallization in its surface cannot be brought about if the $Li_2O$ content is less than about 4 parts by weight. Compositions in which the weight ratio $Li_2O/Al_2O_3$ is substantially more than 0.3/1 tend to crystallize throughout when heat treated.

Other compatible metal oxides may also be present, provided that their total amount does not exceed about 10 parts by weight per 100 parts by weight of the total of $SiO_2$, $Li_2O$, and $Al_2O_3$. A compatible metal oxide is one which does not materially affect the fundamental characteristics of the product. Such compatible metal oxides include PbO, $TiO_2$, $B_2O_3$, BeO, MgO, CaO, ZnO, SrO, CdO and BaO. The oxides PbO, $TiO_2$ and $B_2O_3$ promote surface crystallization in the above described glasses. The $TiO_2$ content preferably should not exceed about 2.5 parts because its presence in significantly greater amount tends to promote crystallization throughout the entire mass as is shown in application Serial No. 718,398, filed March 3, 1958 by Stanley D. Stookey. The $B_2O_3$ should not exceed about 5 parts and preferably not over 1 part and PbO should not exceed about 10 parts. Up to about 2 parts of $Na_2O$ has no harmful effect on the finished product; but the presence of any substantial amount of $K_2O$ tends to cause a diminution of the mechanical strength of the product.

In another application Serial No. 824,178 filed concurrently herewith, now U.S. Patent No. 2,998,675, we have disclosed and claimed a method and an article similar to the method and the article of this application but utilizing glasses containing at least 65 parts $SiO_2$ and 22.5–30 parts $Al_2O_3$ and also containing $TiO_2$, $B_2O_3$, $Na_2O$ or PbO as crystallization catalyst and essential constituents.

The present invention is illustrated by way of examples in Table I in which are shown the compositions of glasses falling within the above-stated range calculated from their respective batches to the oxide basis in parts by weight, exclusive of minor impurities in the batch materials.

TABLE I

|  | 1 | 2 | 3 | 4 | 5 | 6 |
|---|---|---|---|---|---|---|
| $SiO_2$ | 54.0 | 55.2 | 56.5 | 61.0 | 61.4 | 61.2 |
| $Al_2O_3$ | 36.0 | 34.8 | 34.0 | 30.6 | 30.3 | 30.4 |
| $Li_2O$ | 10.0 | 10.0 | 9.5 | 8.4 | 8.3 | 8.4 |
| $TiO_2$ | 2.0 |  |  | 2.5 | 2.5 |  |
| $Na_2O$ |  |  |  |  | 1.0 |  |
| $B_2O_3$ |  |  |  |  |  | 0.4 |
| CaO |  |  |  |  |  |  |
| BaO |  |  |  |  |  |  |

|  | 7 | 8 | 9 | 10 | 11 | 12 |
|---|---|---|---|---|---|---|
| $SiO_2$ | 61.0 | 62.8 | 63.1 | 53.5 | 52.0 | 61.0 |
| $Al_2O_3$ | 30.6 | 29.2 | 28.5 | 37.2 | 38.3 | 32.6 |
| $Li_2O$ | 8.4 | 8.0 | 8.4 | 9.3 | 9.7 | 6.4 |
| $TiO_2$ |  | 2.5 | 2.5 |  | 2.0 |  |
| $Na_2O$ |  |  |  | 1.0 |  |  |
| $B_2O_3$ |  |  |  | 0.5 |  | 0.5 |
| CaO |  |  | 2.5 |  |  | 1.0 |
| BaO |  |  | 1.0 |  |  |  |
| MgO |  |  |  | 3.5 |  |  |
| ZnO |  |  |  |  | 1.0 |  |
| SrO |  |  |  |  | 1.5 |  |
| CdO |  |  |  |  |  | 1.5 |
| BeO |  |  |  |  |  | 1.0 |

The same compositions are shown in Table II in weight percent together with the times (hrs.) and temperatures (° C.) of heat treatment and the moduli of rupture (p.s.i.$\times 10^{-3}$) of the resulting articles having a semicrystalline surface layer.

TABLE II

|  | 1 | 2 | 3 | 4 | 5 | 6 |
|---|---|---|---|---|---|---|
| $SiO_2$ | 53.0 | 55.2 | 56.5 | 59.5 | 59.3 | 61.0 |
| $Al_2O_3$ | 35.2 | 34.8 | 34.0 | 29.9 | 29.3 | 30.2 |
| $Li_2O$ | 9.8 | 10.0 | 9.5 | 8.2 | 8.0 | 8.4 |
| $TiO_2$ | 2.0 |  |  | 2.4 | 2.4 |  |
| $Na_2O$ |  |  |  |  | 1.0 |  |
| $B_2O_3$ |  |  |  |  |  | 0.4 |
| CaO |  |  |  |  |  |  |
| BaO |  |  |  |  |  |  |
| Hrs | 14 | 8 | 8 | 5 | 1/6 | 8 |
| ° C | 800 | 820 | 820 | 820 | 780 | 830 |
| P.s.i.$\times 10^{-3}$ | 56 | 63 | 41 | 75 | 53 | 42.6 |

|  | 7 | 8 | 9 | 10 | 11 | 12 |
|---|---|---|---|---|---|---|
| $SiO_2$ | 61.0 | 61.3 | 59.3 | 50.9 | 49.7 | 58.6 |
| $Al_2O_3$ | 30.6 | 28.4 | 27.1 | 35.4 | 36.7 | 31.3 |
| $Li_2O$ | 8.4 | 7.8 | 7.9 | 8.8 | 9.2 | 6.1 |
| $TiO_2$ |  | 2.5 | 2.4 |  | 1.9 |  |
| $Na_2O$ |  |  |  | 1.0 |  |  |
| $B_2O_3$ |  |  |  | 0.5 |  | 0.5 |
| CaO |  |  | 2.4 |  |  | 1.0 |
| BaO |  |  | 0.9 |  |  |  |
| MgO |  |  |  | 3.4 |  |  |
| ZnO |  |  |  |  | 1.0 |  |
| SrO |  |  |  |  | 1.5 |  |
| CdO |  |  |  |  |  | 1.5 |
| BeO |  |  |  |  |  | 1.0 |
| Hrs | 11 | 5.5 | 10 | 12 | 16 | 7 |
| ° C | 820 | 820 | 810 | 810 | 790 | 800 |
| P.s.i.$\times 10^{-3}$ | 25.6 | 64 | 50 | 52 | 49 | 60 |

The batch materials for the above glasses may comprise any materials, either oxides or other compounds, which, on being fused together, are converted to the desired oxide compositions in the desired proportions. Preferably, compounds such as petalite or spodumene, comprising 2 or more of the oxides of the final composition should be used in order to provide glasses of optimum homogeneity. Although it is immaterial whether the batches contain oxidizing or reducing agents, they preferably either should contain oxidizing agents or should be neutral (i.e., contain neither an oxidizing nor a reducing agent) in order to avoid the difficulties normally encountered in fining reduced glasses. Fining of the present glasses was accomplished by adding $As_2O_3$ to the batch. Too large an amount of $As_2O_3$, say more than 1%, tends to diminish the strength of the final product. The reason for this is not known. The $As_2O_3$ was omitted from the tables for convenience, since the residual amount normally remaining in the glass is too small to have any material effect on its fundamental properties. The batches should be melted for at least 4 hours or more at about 1400° C. or as much higher as may be necessary to produce homogeneous melts in crucibles, pots or tanks depending upon the size of the melt.

The modulus of rupture is measured by supporting individual rods of the semicrystalline product, about ¼ inch in diameter and 4 inches long, on 2 knife edges spaced 3½ inches apart and individually loading them on 2 downwardly acting knife edges about ¾ inch apart and centrally spaced from the lower knife edges until breakage of the rods occurs. To make the results more comparable, the rods are first abraded by being rolled in a ball mill for 15 minutes with 30 grit silicon carbide. Ordinarily, five or more rods are thus tested to obtain the average value which is calculated in p.s.i. Abraded rods of annealed glass in general, when measured in this manner, show moduli of rupture ranging from 6,000 to 8,000 p.s.i.

It is believed that microscopic cracks in the surface of the glass before it is heat treated may have a weakening effect on the modulus of rupture of the finished article. In order to eliminate such cracks and avoid such effect the glass article may, if desired, be acid washed before being heat treated. Acid washing for this purpose is known as fortification and preferably comprises immersing the article for about 10 seconds in a solution composed of equal parts of 70% aqueous HF, concentrated H₂SO₄ and water; rinsing it in a 5% aqueous solution of HNO₃; and thereafter rinsing it in water. Such acid washing may be repeated several times, if desired, although a single treatment ordinarily is effective.

In carrying out the invention, articles composed of the above described glasses are heat treated at the viscosities and for the times set forth above or until their moduli of rupture exceed about 15,000 or, preferably, 20,000 p.s.i. It has been found desirable to limit the rate of temperature increase of articles having a thickness of about ¼ inch or more to a maximum of about 5° C. per minute, in order to avoid excessive thermal gradients which might cause shattering, although much higher rates can be tolerated if the bodies are thin and substantially uniform in cross section. Instead of raising the temperature and holding it for a specific length of time, the temperature may be raised continually through the stated range of viscosities at a rate so slow that surface crystallization adequate for the present purpose will have occurred when a viscosity in the neighborhood of $10^7$ poises or less is attained.

We have found that only glasses which comprise primarily of $Li_2O$, $Al_2O_3$ and $SiO_2$ within the above stated ranges of proportions, are effective for carrying out the new method and producing the above described new article.

What is claimed is:

1. The method of making a glass body with a high modulus of rupture having on its surface a thin, compressive, semicrystalline layer of the same oxide composition as the glass, which comprises heat treating a glass body consisting essentially by weight, on the basis of a total composition of not more than 110 parts, of at least 52 but less than 65 parts of $SiO_2$, not less than 4 parts of $Li_2O$ and not more than 40 parts of $Al_2O_3$, the weight ratio $Li_2O/Al_2O_3$ being not more than about 0.3/1, the sum of the $SiO_2$, $Li_2O$, and $Al_2O_3$ being at least 100 parts, by heating it at a temperature at which its viscosity is between $10^7$ and $10^{10}$ poises for a time ranging from about 1 hour to 40 hours, respectively, until microscopic and submicroscopic crystals of beta-eucryptite are formed within its surface.

2. The method of claim 1 in which the glass body is fortified by acid washing before being heat treated.

3. An article comprising a glass body having on its entire surface a thin, compressive, semicrystalline layer containing a multiplicity of microscopic crystals of beta-eucryptite and having a linear thermal expansion coefficient substantially lower than that of the glass body, the oxide composition of the article being substantially the same throughout and consisting essentially by weight, on the basis of a total composition of not more than 110 parts, of at least 52 but less than 65 parts of $SiO_2$, not less than 4 parts of $Li_2O$ and not more than 40 parts of $Al_2O_3$, the weight of $Li_2O/Al_2O_3$ being not more than about 0.3/1, the sum of the $SiO_2$, $Li_2O$, and $Al_2O_3$ being at least 100 parts.

4. The article of claim 3 in which the proportion of its total composition greater than the sum of the recited constituents consists of up to a total of 10 parts by weight of compatible metal oxides selected from the group consisting of PbO, BeO, MgO, CaO, ZnO, SrO, CdO, BaO, up to about 5 parts of $B_2O_3$, up to about 2.5 parts of $TiO_2$, and up to about 2 parts of $Na_2O$.

No references cited.

DONALL H. SYLVESTER, *Primary Examiner.*

D. CRUPAIN, *Assistant Examiner.*